(12) United States Patent
Kunze

(10) Patent No.: US 10,324,297 B2
(45) Date of Patent: Jun. 18, 2019

(54) HEADS UP DISPLAY SYSTEM FOR VEHICLE

(71) Applicant: MAGNA ELECTRONICS INC., Auburn Hills, MI (US)

(72) Inventor: Norbert Kunze, Diez (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 246 days.

(21) Appl. No.: 15/364,354

(22) Filed: Nov. 30, 2016

(65) Prior Publication Data

US 2017/0153457 A1     Jun. 1, 2017

Related U.S. Application Data

(60) Provisional application No. 62/260,759, filed on Nov. 30, 2015.

(51) Int. Cl.

| | |
|---|---|
| *H04N 11/02* | (2006.01) |
| *H04N 7/18* | (2006.01) |
| *H04N 11/04* | (2006.01) |
| *G02B 27/01* | (2006.01) |
| *H04N 5/374* | (2011.01) |
| *G02B 27/00* | (2006.01) |
| *B60K 35/00* | (2006.01) |
| *H04N 13/322* | (2018.01) |
| *G06K 9/00* | (2006.01) |
| *H04N 13/302* | (2018.01) |

(Continued)

(52) U.S. Cl.
CPC .......... *G02B 27/0179* (2013.01); *B60K 35/00* (2013.01); *G02B 27/0093* (2013.01); *G02B 27/0101* (2013.01); *G06K 9/00845* (2013.01); *H04N 5/374* (2013.01); *H04N 13/302* (2018.05); *H04N 13/322* (2018.05); *H04N 13/363* (2018.05); *H04N 13/376* (2018.05); *B60K 2350/2013* (2013.01); *B60K 2350/2052* (2013.01); *B60K 2350/352* (2013.01); *G02B 2027/014* (2013.01); *G02B 2027/0134* (2013.01); *G02B 2027/0138* (2013.01); *G02B 2027/0154* (2013.01); *G02B 2027/0181* (2013.01); *G02B 2027/0187* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Talha M Nawaz
(74) *Attorney, Agent, or Firm* — Honigman LLP

(57) ABSTRACT

A display system of a vehicle includes a camera disposed at a vehicle and having a field of view interior of the vehicle that encompasses a head region of a driver of the vehicle. An image processor is operable to process image data captured by the camera to determine a location of both eyes of the driver of the vehicle. A display device is operable to display or project a first image and a second image for viewing by the driver of the vehicle. A first reflector element that is adjusted, responsive to image processing by the image processor of image data captured by the camera, to reflect the first and second images so that a left eye of the driver views the reflected first image and a right eye of the driver views the reflected second image.

20 Claims, 2 Drawing Sheets

(51) Int. Cl.
*H04N 13/376* (2018.01)
*H04N 13/363* (2018.01)

(56) References Cited

U.S. PATENT DOCUMENTS

| | | | |
|---|---|---|---|
| 5,949,331 A | 9/1999 | Schofield et al. | |
| 7,043,056 B2 | 5/2006 | Edwards et al. | |
| 7,331,671 B2 | 2/2008 | Hammoud | |
| 7,460,693 B2 | 12/2008 | Loy et al. | |
| 7,572,008 B2 | 8/2009 | Elvesjo et al. | |
| 7,653,213 B2 | 1/2010 | Longhurst et al. | |
| 7,914,187 B2 | 3/2011 | Higgins-Luthman et al. | |
| 8,066,375 B2 | 11/2011 | Skogo et al. | |
| 8,120,577 B2 | 2/2012 | Bouvin et al. | |
| 8,165,347 B2 | 4/2012 | Heinzmann et al. | |
| 8,185,845 B2 | 5/2012 | Bjorklund et al. | |
| 8,220,926 B2 | 7/2012 | Blixt et al. | |
| 8,314,707 B2 | 11/2012 | Kobetski et al. | |
| 8,339,446 B2 | 12/2012 | Blixt et al. | |
| 8,342,687 B2 | 1/2013 | Blixt et al. | |
| 8,562,136 B2 | 10/2013 | Blixt et al. | |
| 8,610,768 B2 | 12/2013 | Holmberg et al. | |
| 10,017,114 B2 | 7/2018 | Bongwald | |
| 2003/0169907 A1 | 9/2003 | Edwards et al. | |
| 2004/0193371 A1 | 9/2004 | Koshiji et al. | |
| 2006/0274973 A1 | 12/2006 | Mohamed et al. | |
| 2007/0014916 A1 | 1/2007 | Daniels | |
| 2007/0297692 A1 | 12/2007 | Hamatani et al. | |
| 2008/0077882 A1 | 3/2008 | Kramer et al. | |
| 2009/0304232 A1 | 12/2009 | Tsukizawa | |
| 2010/0097580 A1 | 4/2010 | Yamamoto et al. | |
| 2012/0093358 A1 | 4/2012 | Tschirhart | |
| 2012/0154591 A1 | 6/2012 | Baur et al. | |
| 2012/0224062 A1* | 9/2012 | Lacoste | G01C 21/365 348/148 |
| 2013/0050258 A1 | 2/2013 | Liu et al. | |
| 2013/0229523 A1 | 9/2013 | Higgins-Luthman et al. | |
| 2014/0062946 A1 | 3/2014 | Graumann et al. | |
| 2014/0063359 A1 | 3/2014 | Chen | |
| 2014/0072230 A1 | 3/2014 | Ruan et al. | |
| 2014/0139655 A1* | 5/2014 | Mimar | G08B 21/06 348/77 |
| 2014/0218529 A1 | 8/2014 | Mahmoud et al. | |
| 2014/0232746 A1* | 8/2014 | Ro | H04N 13/0402 345/633 |
| 2014/0247352 A1 | 9/2014 | Rathi et al. | |
| 2014/0300739 A1 | 10/2014 | Mimar | |
| 2014/0300830 A1 | 10/2014 | Wang | |
| 2014/0336876 A1 | 11/2014 | Gieseke et al. | |
| 2015/0009010 A1 | 1/2015 | Biemer | |
| 2015/0022664 A1 | 1/2015 | Pflug et al. | |
| 2015/0092042 A1 | 4/2015 | Fursich | |
| 2015/0145995 A1 | 5/2015 | Shahraray et al. | |
| 2015/0156383 A1 | 6/2015 | Biemer et al. | |
| 2015/0158499 A1 | 6/2015 | Koravadi | |
| 2015/0185834 A1 | 7/2015 | Wingrove et al. | |
| 2015/0232030 A1 | 8/2015 | Bongwald | |
| 2015/0294148 A1 | 10/2015 | Mohanakrishnan et al. | |
| 2015/0294169 A1 | 10/2015 | Zhou et al. | |
| 2015/0296135 A1 | 10/2015 | Wacquant et al. | |
| 2016/0137126 A1 | 5/2016 | Fursich et al. | |
| 2016/0209647 A1 | 7/2016 | Fursich | |

* cited by examiner

HEADS UP DISPLAY SYSTEM FOR VEHICLE

CROSS REFERENCE TO RELATED APPLICATION

The present application claims the filing benefits of U.S. provisional application Ser. No. 62/260,759 filed Nov. 30, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides enhanced display of images (such as images captured by one or more exteriorly viewing cameras of the vehicle or images derived from or generated by a navigation system of the vehicle or telematics system of the vehicle or vehicle diagnostics system or other image generating system of the vehicle) for viewing by both eyes of the driver, with each eye viewing a respective displayed or projected image.

According to an aspect of the present invention, a display system of a vehicle includes a camera disposed at the vehicle so as to have a field of view interior of the vehicle that encompasses a head region of a driver of the vehicle. An image processor is operable to process image data captured by the camera to determine a location of both eyes of the driver of the vehicle. A display device is operable to display or project two images, and a first reflector element is adjustable to reflect the displayed or projected images so that each eye of the driver views a respective one of the reflected displayed or projected images.

The first reflector element may comprise a curved reflector element and each of the displayed or projected images may reflect off of a respective area of the curved reflector element. A second reflector element may be provided having two reflective portions for reflecting a respective reflected displayed or projected image from the curved reflector element. The second reflector element may comprise a portion of a windshield of the vehicle.

The first reflector element may be adjustable to adjust the optical path between the display device, the first reflector element and the driver's eyes (to accommodate different drivers and/or movement of the present driver of the vehicle). The display device may comprise two separate display screens, each operable to display images for viewing by a respective eye of the driver of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
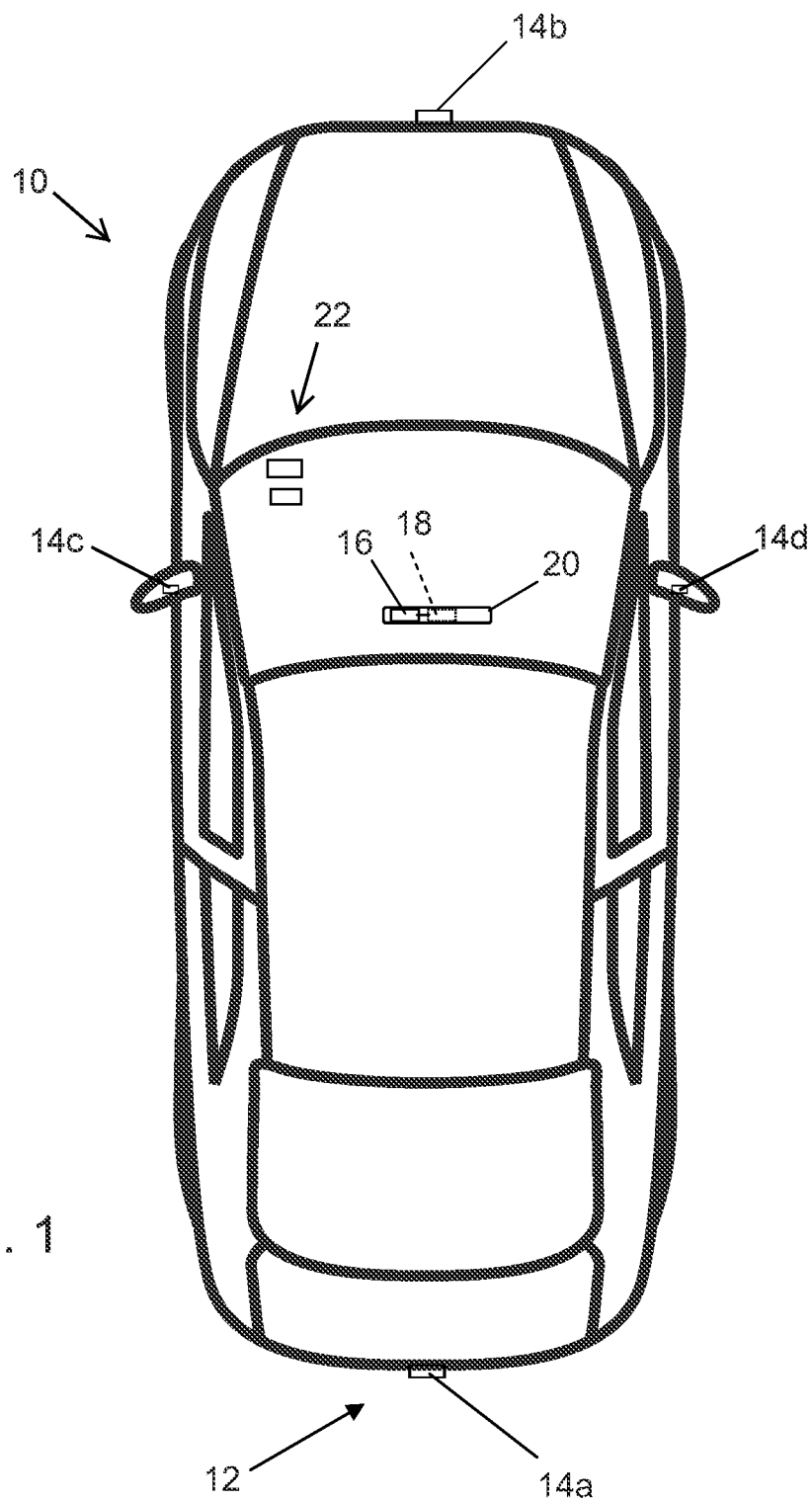
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system of the present invention includes an interior cabin or driver monitoring system 22, which includes at least one camera 7 (FIG. 2) disposed in the vehicle and having a field of view that encompasses the head region of the driver of the vehicle. An image processor processes image data captured by the camera or cameras to determine the location of the driver's eyes, and the display system of the present invention displays images viewable by respective ones of the driver's eyes, as discussed below. The driver monitoring system may utilize aspects of the systems described in U.S. Pat. No. 7,914,187 and/or U.S. Publication Nos. US-2015-0296135; US-2015-0294169; US-2015-0232030; US-2015-0158499 and/or US-2014-0336876, which are hereby incorporated herein by reference in their entireties. The system of the present invention may also or otherwise utilize aspects of the systems described in U.S. Publication No. US-2016-0209647, which is hereby incorporated herein by reference in its entirety.

Known vehicle windshield head up display systems as well as combiner head up display systems, such as OEM or aftermarket equipment, have one head box directed towards the driver's eyes after passing reflective elements such as a curved mirror and the windshield or combiner respectively.

The display system of the present invention provides a new and inventive system having two small eye boxes directed to one eye each of the vehicle's driver. By that each eye receives an independent image projected by a respective display device. The image pair may have stereoscopic properties which enables the driver to see the projection in 3D without wearing additional appliances such as a shutter mask, green and red filtered goggles or polarization filtering glasses such as know from prior art 3D displays.

For generating two eye boxes, two images have to be generated. There may be two display elements, such as TFTs, LED or OLED or LASER displays or other suitable display screens or devices, from which the displayed images may be directed via one optical path each to one eye only. Both optical paths may use identical reflective elements such as sharing the windshield as a reflective surface. Optionally, the first reflective element is shared by both eye images (eye box) optical paths. Optionally, each eye box's optical path has a separate respective first reflective element. As an alternative option, one display may generate two images viewable from two different viewing angles which may be directed via according mirrors to the respective one eye.

For continuously tracking the eye boxes towards the driver's eyes the optical paths may be steerable. The optical paths may be steered by altering the reflective direction of the first mirror element or mirror elements when being separated accordingly. Optionally, the optical path may be altered by shifting and turning the display elements. Optionally, the optical paths may be altered by turning the second mirror element (the windshield may not be turnable), such as turning and shifting the combiner. In some of these solutions it may be necessary to turn the source images electronically or to turn the display element or elements for preventing turning of the viewed image when the reflective elements or displays gets turned for tracking the driver's eyes.

To track the viewer's eyes, the vehicle may have an (eventually head and) eye tracking system (such as by utilizing aspects of the systems described in U.S. Pat. No. 7,914,187 and/or U.S. Publication Nos. US-2016-0137126; US-2015-0352953; US-2015-0296135; US-2015-0294169; US-2015-0232030; US-2015-0022664; US-2015-0015710; US-2015-0009010; US-2015-0158499 and/or US-2014-0336876, incorporated above). The eye tracking system's camera or cameras may be installed in front or frontal-sideward of the driver for detecting the driver's eyes directly or may be installed in a hidden area for indirectly imaging and detecting the eye via one or more reflective elements. Optionally, the reflective elements may be the identical with those of the head up display. Optionally, one eye tracking camera may be positioned centered in between the display elements of the head up displays. Optionally, the eye tracking cameras are positioned left and right of the display elements at the same heights of the display elements.

Figure 2:
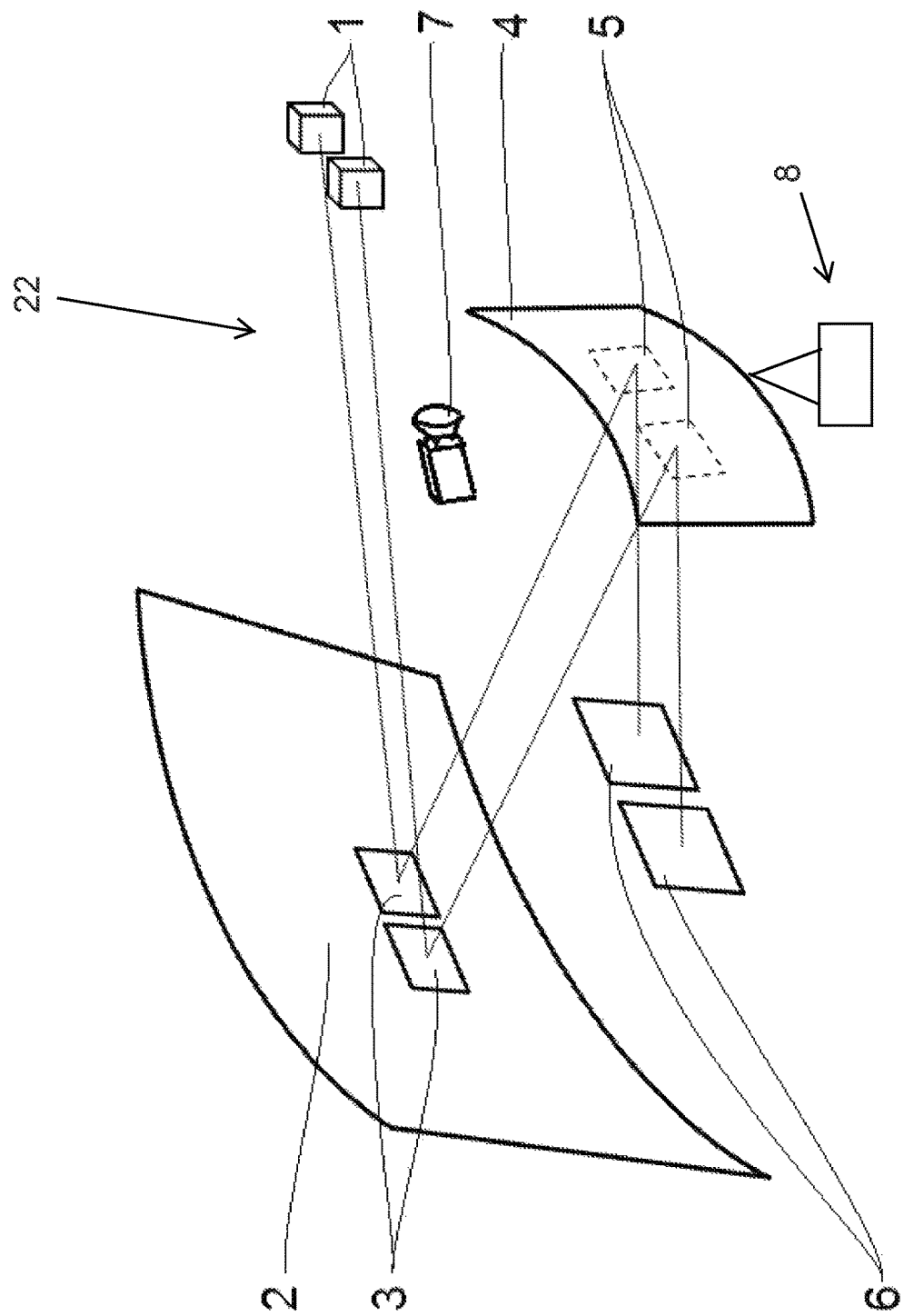
FIG. 2 is a schematic of a head up display system in accordance with the present invention.

As shown in FIG. 2, the head up display system operates to project or display images viewable by the respective eyes of the driver (represented by the two eye boxes 1). The head up display system includes a windshield 2 (used as a second reflector element), a curved mirror 4 (used as a first reflector element), two display or projecting devices 6 and the eye tracking camera 7. The processing system processes image data captured by the camera to determine the location and viewing direction of the left and right eyes of the driver of the vehicle. The curved mirror has two reflection areas 5 for the first reflective element (shown from behind but the mirror is not semi-transparent), and the windshield has two reflection areas 3 for respective ones of the eye boxes light paths (from the displays 6 to the reflective areas 5 at the first reflective element to the reflective areas 3 of the second reflective element to the driver's eyes or eye boxes 1). Thus, each eye of the driver receives a respective image displayed by or projected by the display devices or display screens 6.

The reflector element 4 is adjustable to adjust the angle of reflection of the displayed images and thus to adjust the optical path between the display devices 6, the reflector element 4, the second reflector element or windshield 2 and the eye boxes 1. The reflector element 4 is adjustable via an actuator system 8 that pivots or moves the reflector element about a horizontal axis (so as to vertically adjust the reflection angle to adjust for different height drivers) and/or about a vertical axis (so as to horizontally adjust the reflection angle) and/or multiple axes (such as via a ball and socket mount) to provide the appropriate reflection angle and optical path for the particular driver eye locations.

The camera 7 captures image data and the image processor processes the captured image data to detect and track the driver's eyes (generally at the eye boxes 1) and the first reflective element or curved mirror 4 may be adjusted to adjust the display/projection and reflection of the displayed images to direct the displayed images to the respective eye boxes. The mirror 4 may be adjusted about multiple axes to adjust the optical paths as the driver's eyes may change in vertical or horizontal directions (such as due to a change in driver to a different driver of different height or responsive to the driver moving his or her head sidewardly or vertically). Thus, the present invention projects images to each eye of the driver independently of the other eye. The present invention thus provides for enhanced display of images, such as three dimensional images, for viewing by the driver of the vehicle while the driver is normally operating the vehicle and viewing through the windshield of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat.

Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A display system of a vehicle, said display system comprising:
   a camera disposed at a vehicle and having a field of view interior of the vehicle that encompasses a head region of a driver of the vehicle;
   an image processor operable to process image data captured by said camera to determine a location of both eyes of the driver of the vehicle;
   a display device operable to display or project a first image and a second image for viewing by the driver of the vehicle;
   a first reflector element that is adjustable, wherein said first reflector element is adjusted, responsive to image processing by said image processor of image data captured by said camera, to reflect the first and second images so that a left eye of the driver views the reflected first image and a right eye of the driver views the reflected second image;
   wherein the reflected first image is different than the reflected second image; and
   wherein the reflected first image is viewed by the left eye of the driver independent of viewing of the reflected second image by the right eye of the driver.

2. The display system of claim 1, wherein said first reflector element comprises a curved reflector element.

3. The display system of claim 2, wherein the reflected first image reflects off of a first area of said curved reflector element and wherein the reflected second image reflects off of a second area of said curved reflector element.

4. The display system of claim 3, comprising a second reflector element having first and second reflective portions for reflecting a respective reflected first and second image from said curved reflector element.

5. The display system of claim 2, comprising a second reflector element for reflecting reflected first and second images from said curved reflector element.

6. The display system of claim 5, wherein said second reflector element comprises a portion of a windshield of the vehicle.

7. The display system of claim 1, wherein said first reflector element is adjustable to adjust the optical path between said first reflector element and the driver's eyes.

8. The display system of claim 1, wherein said display device comprises a display screen that displays the first and second images.

9. The display system of claim 8, wherein a first portion of said display screen displays the first images for viewing by the left eye of the driver of the vehicle and wherein a second portion of said display screen displays the second images for viewing by the right eye of the driver of the vehicle.

10. The display system of claim 1, wherein said display device comprises a first display screen and a second display screen.

11. The display system of claim 10, wherein said first display screen displays the first images for viewing by the left eye of the driver of the vehicle and wherein said second display screen displays the second images for viewing by the right eye of the driver of the vehicle.

12. A display system of a vehicle, said display system comprising:
   a camera disposed at a vehicle and having a field of view interior of the vehicle that encompasses a head region of a driver of the vehicle;
   an image processor operable to process image data captured by said camera to determine a location of both eyes of the driver of the vehicle;
   a display device operable to display or project a first image and a second image for viewing by the driver of the vehicle;
   a first reflector element and a second reflector element disposed along and defining an optical path between said display device and the eyes of the driver of the vehicle;
   a control operable to adjust said first reflector element responsive to image processing by said image processor of image data captured by said camera;
   wherein, responsive to determination, via image processing by said image processor of image data captured by said camera, of the location of both eyes of the driver of the vehicle, said control adjusts said first reflector element to reflect the first and second images so that a left eye of the driver views the reflected first image as reflected off of said first and second reflector elements and a right eye of the driver views the reflected second image as reflected off of said first and second reflector elements;
   wherein the reflected first image is different than the reflected second image; and
   wherein the reflected first image is viewed by the left eye of the driver independent of viewing of the reflected second image by the right eye of the driver.

13. The display system of claim 12, wherein said first reflector element comprises a curved reflector element.

14. The display system of claim 12, wherein the reflected first image reflects off of a first area of said first reflector element and wherein the reflected second image reflects off of a second area of said first reflector element.

15. The display system of claim 14, wherein said second reflector element comprises first and second reflective portions for reflecting a respective reflected first and second image from said first reflector element.

16. The display system of claim 12, wherein said second reflector element comprises a portion of a windshield of the vehicle.

17. The display system of claim 12, wherein said first reflector element is adjustable to adjust the optical path between said first reflector element and said second reflector element and the driver's eyes.

18. The display system of claim 12, wherein said display device comprises at least one display screen that displays the first and second images, and wherein a first portion of said at least one display screen displays the first images for viewing by the left eye of the driver of the vehicle and wherein a second portion of said at least one display screen displays the second images for viewing by the right eye of the driver of the vehicle.

19. A display system of a vehicle, said display system comprising:
   a camera disposed at a vehicle and having a field of view interior of the vehicle that encompasses a head region of a driver of the vehicle;

an image processor operable to process image data captured by said camera to determine a location of both eyes of the driver of the vehicle;

a display device operable to display or project a first image and a second image for viewing by the driver of the vehicle;

a first reflector element and a second reflector element disposed along and defining an optical path between said display device and the eyes of the driver of the vehicle;

wherein said first reflector element comprises a curved reflector element;

wherein said second reflector element comprises a portion of a windshield of the vehicle;

a control operable to adjust said first reflector element responsive to image processing by said image processor of image data captured by said camera;

wherein said control adjusts said first reflector element to adjust the optical path between said display device, said first reflector element, said second reflector element and the driver's eyes;

wherein, responsive to determination, via image processing by said image processor of image data captured by said camera, of the location of both eyes of the driver of the vehicle, said control adjusts said first reflector element to reflect the first and second images so that a left eye of the driver views the reflected first image as reflected off of said first and second reflector elements and a right eye of the driver views the reflected second image as reflected off of said first and second reflector elements;

wherein the reflected first image is different than the reflected second image; and wherein the reflected first image is viewed by the left eye of the driver independent of viewing of the reflected second image by the right eye of the driver.

20. The display system of claim 19, wherein said display device comprises at least one display screen that displays the first and second images, and wherein a first portion of said at least one display screen displays the first images for viewing by the left eye of the driver of the vehicle and wherein a second portion of said at least one display screen displays the second images for viewing by the right eye of the driver of the vehicle.

* * * * *